A. VICTOR.
WOODWORKING MACHINE.
APPLICATION FILED SEPT. 23, 1910.
1,016,379.
Patented Feb. 6, 1912.
3 SHEETS—SHEET 3.
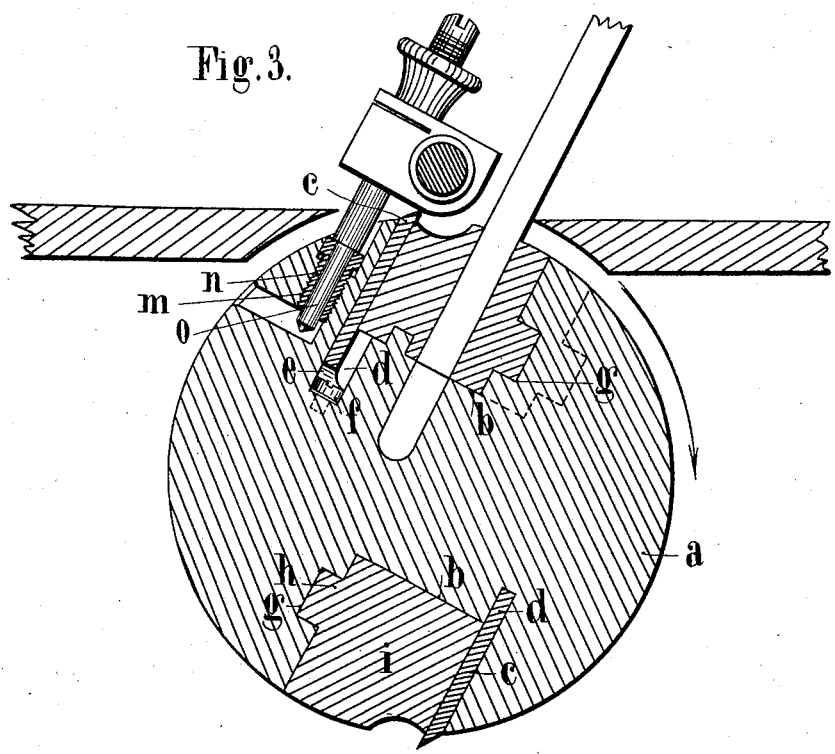
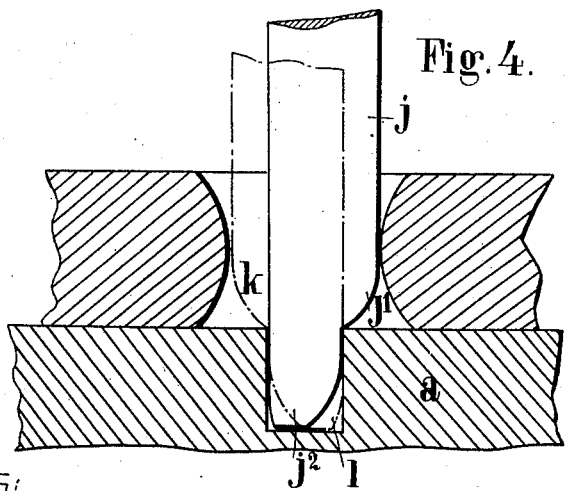

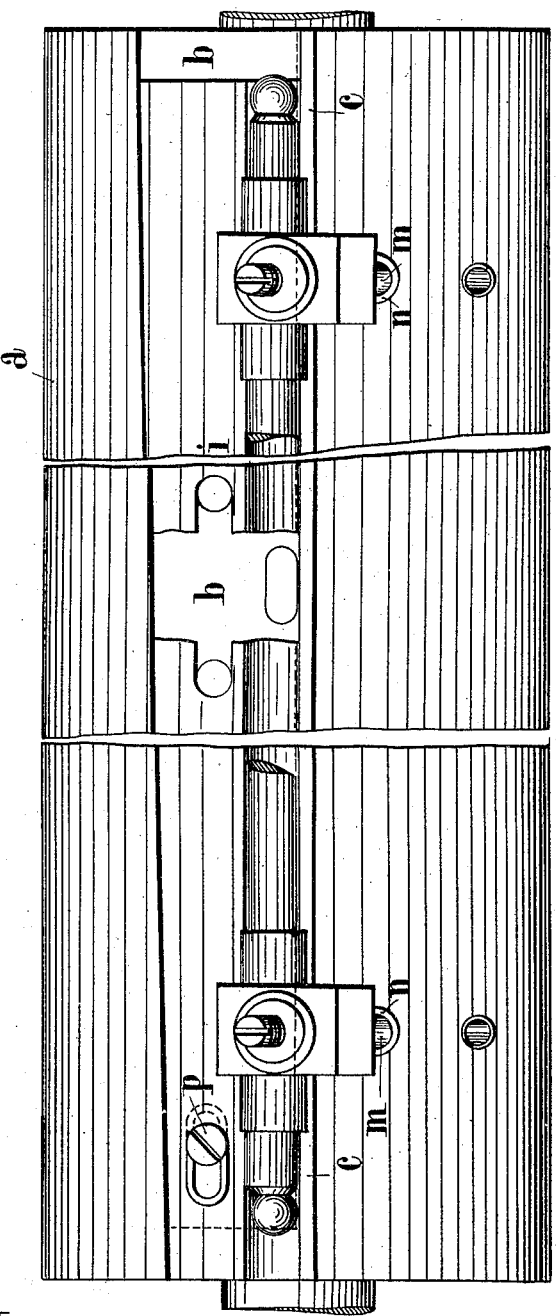

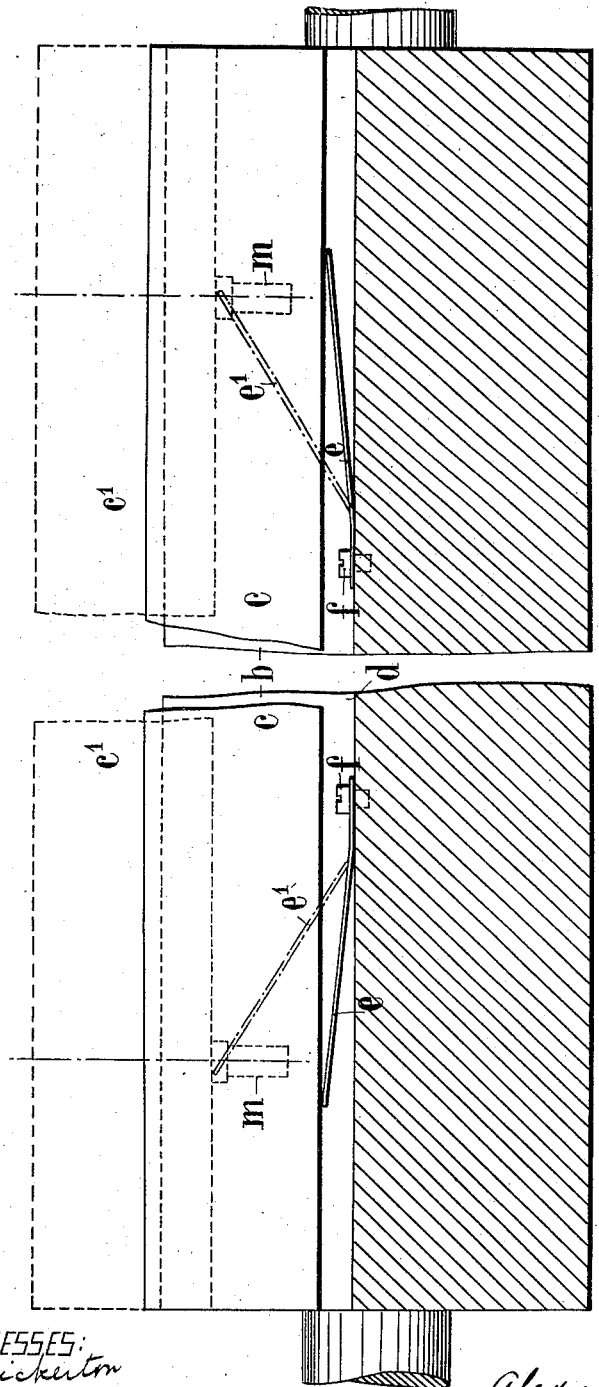

UNITED STATES PATENT OFFICE.

ALEXANDRE VICTOR, OF LYON, FRANCE, ASSIGNOR TO LA SOCIÉTÉ RIBAYRON & VICTOR, OF LYON, FRANCE.

WOODWORKING-MACHINE.

1,016,379.  Specification of Letters Patent.  Patented Feb. 6, 1912.

Application filed September 23, 1910. Serial No. 583,425.

*To all whom it may concern:*

Be it known that I, ALEXANDRE VICTOR, a citizen of the Republic of France, and resident of Lyon, France, have invented new and useful Improvements in Woodworking-Machines, which improvements are fully set forth in the following specification.

The present invention relates to a circular shaft with wedge clamping which is applicable not only to rough smoothing machines but also to any other kind of wood working machine such as planing machines and the like and in which the means employed for fixing the blades and the adjustment of the depth of the said blades eliminate the inconvenience referred to above. The clamping bolts are dispensed with and the blade is fixed while the adjusting device is still in place.

The invention therefore has for its object a method of fixing the blades upon a circular shaft for wood working machines without displacement of the tables characterized by a longitudinal groove with slot for extension springs for the blade and housing for a wedge with tongue and moving during adjustment parallel with the longitudinal axis of the cylinder for the purpose of holding the blade clamped after its adjustment, the fixity of the wedge being obtained first of all by its longitudinal displacement in the groove and subsequently by means of a suitably located set screw.

The invention has likewise for its object for the purpose of regulating the depth of the blade in the slot, the provision upon the cylindrical shaft of two holes, the bottom of which are constituted by hollow screws permitting of the fitting for the adjustment of the blade of the device described in the specification of my prior patent dated October 19, 1909, Number 937,558.

A cylindrical tool holder for a rough smoothing machine is represented by way of example in the accompanying drawing in which:

Figure 1 is a plan view. Fig. 2 is a longitudinal section. Fig. 3 is a cross section. Fig. 4 is a partial vertical section to a larger scale showing in detail the mortises formed in the wedges and the tool holder and the positions of the clamping lever.

This tool holder shown in the drawing comprises a cylinder $a$ in which are formed two longitudinal grooves or slots $b$ oppositely and correspondingly placed in relative position to the blades $c$. The number of grooves in said cylinder may vary, there being always as many grooves as there are blades. Each of the grooves $b$ in which only that wall against which the blade fits is parallel with the axis of the cylinder $a$ (the other being directed obliquely) presents a housing $d$ for the blade $c$ and at the bottom of this housing leaf springs $e$ are fixed at $f$ by means of screws; on the free ends of these springs the edge of the blade $c$ opposite to the cutting edge rests. In addition each of the grooves $b$ comprises upon its oblique wall a slideway $g$ intended for the reception of the tongue $h$ of a wedge $i$ for guiding the latter as it is moved longitudinally in the said groove.

The movement of the wedge $i$ may be produced by means of a lever $j$ (Fig. 4) the part $j'$ of which forms a cam either to the right or to the left and which is introduced according to the direction of the displacement to be obtained, into the mortise $k$ formed in the wedge. The end $j^2$ of the said lever being engaged in the mortise 1 formed in the cylinder $a$, obviously it is only necessary to act upon the lever in inclining it either to the right or to the left according to the direction of the displacement to be obtained in order to cause the blade $c$ to be clamped between the wedge and the wall of the groove or in order to release it.

Suitably disposed with relation to the blades $c$ are holes formed in the cylinder $a$ into which are threaded hollow screws $n$ which may be turned in one direction or the other to regulate the position of the device by means of which the projection of the cutter blades is adjusted.

The operation of the device will readily be understood. The wedge $i$ being loosened, that is to say, turned toward its widest part the blade $c$ is arranged in its housing $d$, the edge resting on the springs $e$ as shown at $e'$ $e'$, Fig. 2; the fingers of the adjusting device described in the specification of the prior patent No. 937,558 are then introduced into the bearing screws $n$. The lever $j$ being arranged in the appropriate position for clamping it is only necessary to force in the adjusting device until the fingers bear against the face of the bearing screws in order that when the springs $e$ yield the blade may be exactly adjusted as to depth. This being accomplished, the lever *j* is moved in the proper direction to force the wedge *i* to its seat and thereby exert a vigorous pressure upon the blade. The clamping of the blades by means of the wedges is sufficient in practice but a screw *p* may be provided in order to increase the certainty of the clamping.

Finally it should be understood that although the invention has been described as being more particularly applicable to a rough smoothing machine it is likewise adapted for any wood working machine comprising a similar tool holder whatever the arrangement of its tables may be. It will likewise be understood that the adjustment of the blades might be obtained by any means other than that described in the specification of the aforesaid Patent No. 937,558, the clamping device forming the characteristic feature of the present invention remaining the same.

I claim—

1. A cutter head formed with a longitudinal groove, one side of which groove is straight and parallel to the axis of said head and the other side inclined thereto, the bottom of said groove having a slot formed therein adjacent its straight side, a cutter blade within said groove and slot and bearing against the continuous straight side thereof, a wedge block longitudinally movable in said groove, and resilient means in the bottom of said slot for elevating and temporarily supporting the cutter blade when the wedge block is loosened, said wedge block adapted to move longitudinally in said groove for clamping the cutter blade between itself and the straight side of the groove.

2. A cutter head formed with a longitudinal groove, one side of which groove is straight and parallel to the axis of said head and the other side inclined thereto, a cutter blade bearing on the straight side of said groove, a wedge block longitudinally movable in said groove, and resilient means in the bottom of said groove adjacent its parallel side for elevating and temporarily supporting the cutter blade when the wedge block is loosened, said cutter head and wedge block being provided with registering slots for the insertion of a lever by means of which said wedge block may be moved longitudinally in opposite directions to clamp and unclamp the cutter blade.

In testimony whereof I have signed this specification in the presence of two subscribing witnesses.

ALEXANDRE VICTOR.

Witnesses:
 JULES BUCHAILLERT,
 ISIDORE ERARD.

---

Copies of this patent may be obtained for five cents each, by addressing the "Commissioner of Patents, Washington, D. C."